Figure 1:
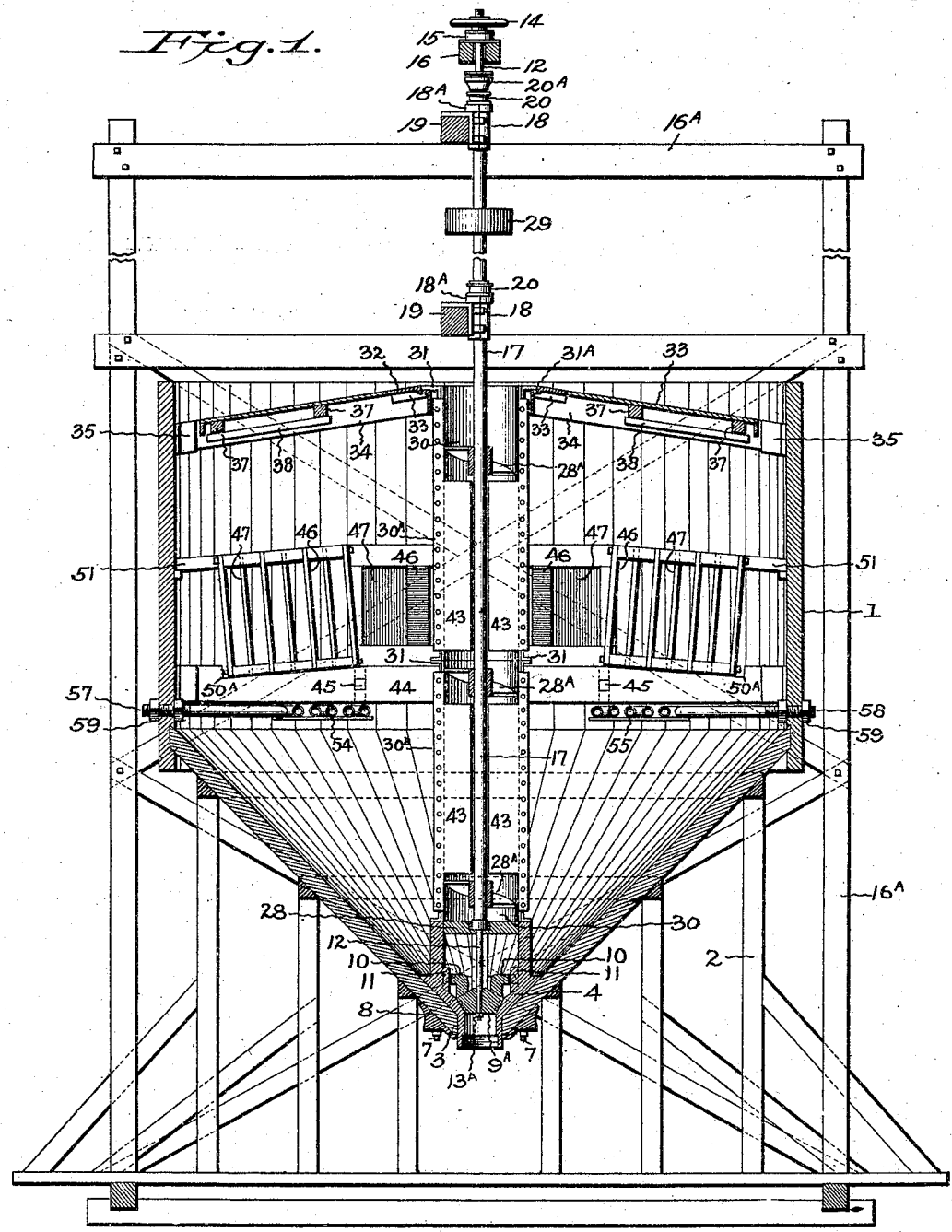

No. 785,214. PATENTED MAR. 21, 1905.
W. A. HENDRYX.
APPARATUS FOR EXTRACTING METALS FROM THEIR ORES.
APPLICATION FILED AUG. 29, 1904.

4 SHEETS—SHEET 1.

Witnesses:
G. Sargent Elliott
Bessie Thompson

Inventor:
Wilbur A. Hendryx.
By H. S. Bailey, Attorney.

No. 785,214. PATENTED MAR. 21, 1905.
W. A. HENDRYX.
APPARATUS FOR EXTRACTING METALS FROM THEIR ORES.
APPLICATION FILED AUG. 29, 1904.

4 SHEETS—SHEET 2.

Witnesses:
G. Sargent Elliott
Bessie Thompson H S Bailey

Inventor:
Wilbur A. Hendryx.
By Attorney.

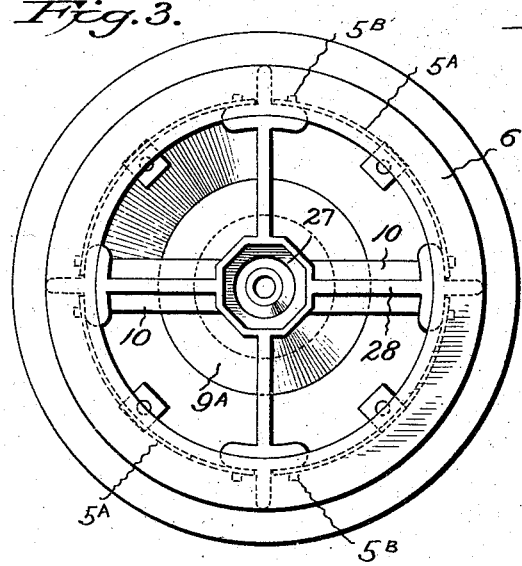
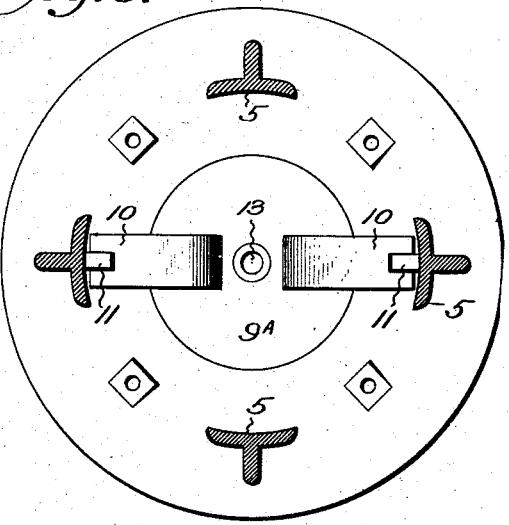
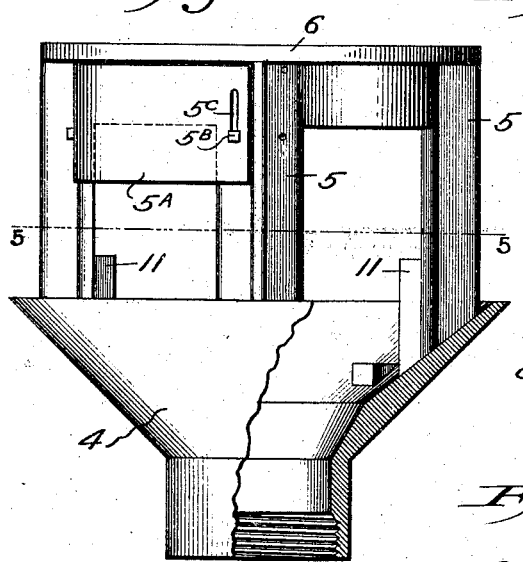
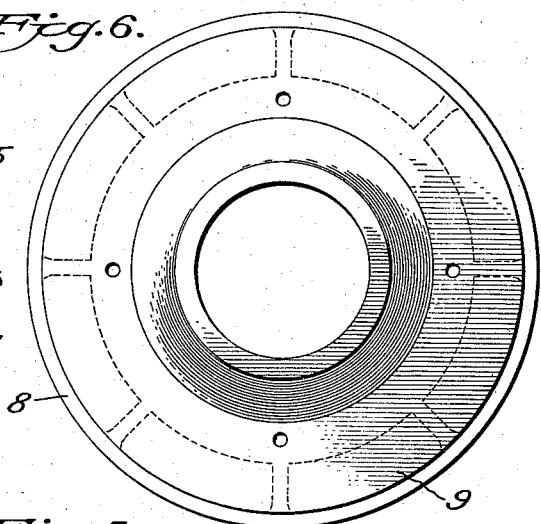
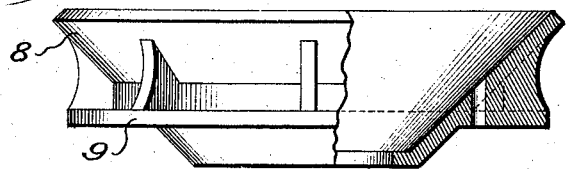

No. 785,214. PATENTED MAR. 21, 1905.
W. A. HENDRYX.
APPARATUS FOR EXTRACTING METALS FROM THEIR ORES.
APPLICATION FILED AUG. 29, 1904.
4 SHEETS—SHEET 4.
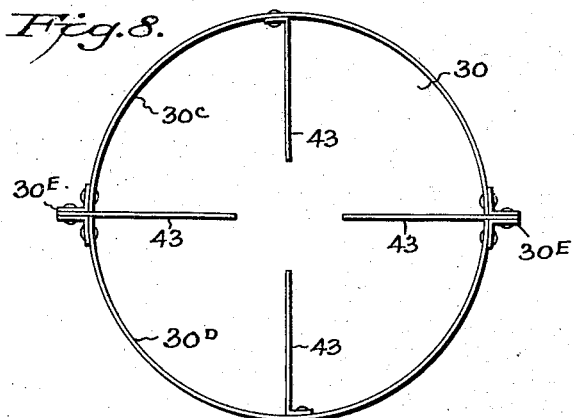
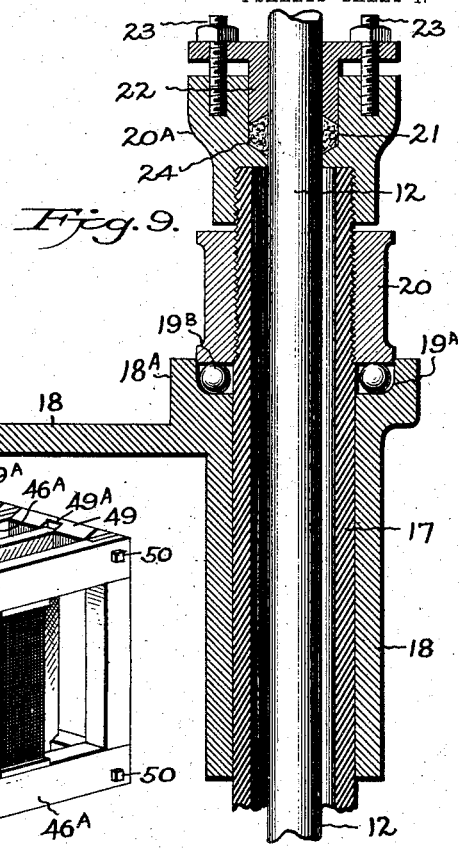
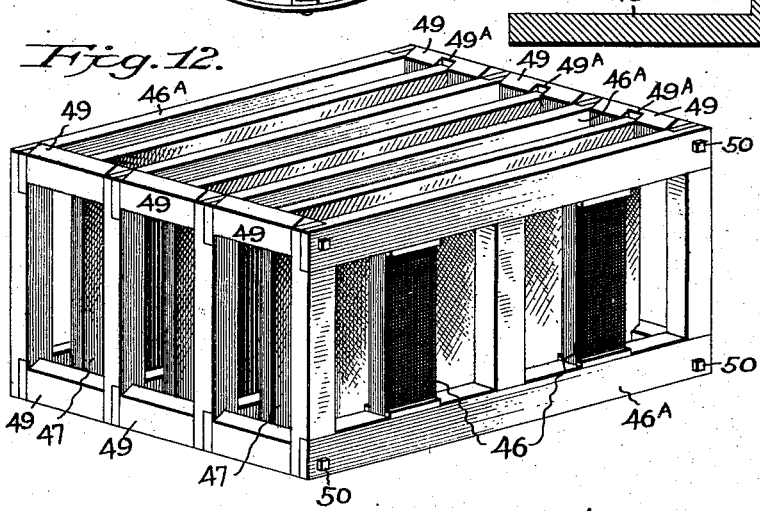
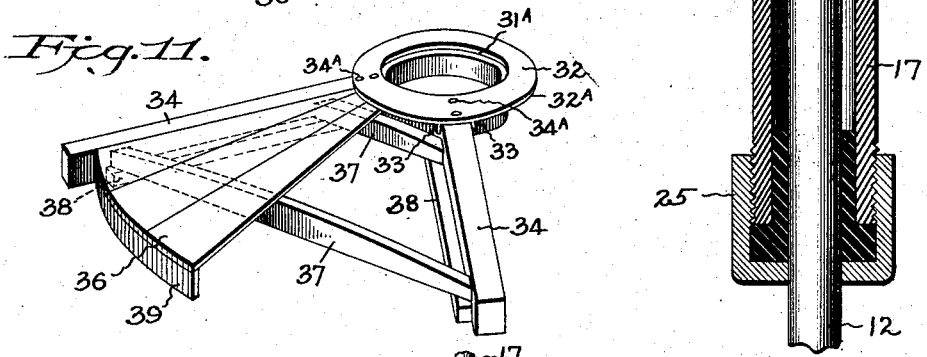
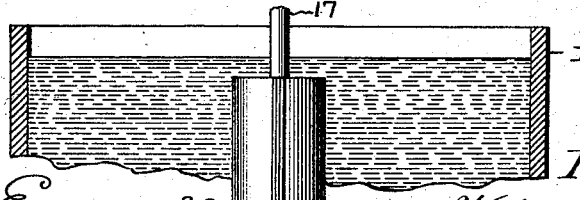
Witnesses:
G. Sargent Elliott.
Bessie Thompson.
Inventor:
Wilbur A. Hendryx,
By H. S. Bailey. Attorney.

No. 785,214. Patented March 21, 1905.

UNITED STATES PATENT OFFICE.

WILBUR A. HENDRYX, OF LOS ANGELES, CALIFORNIA.

APPARATUS FOR EXTRACTING METALS FROM THEIR ORES.

SPECIFICATION forming part of Letters Patent No. 785,214, dated March 21, 1905.

Application filed August 29, 1904. Serial No. 222,618.

*To all whom it may concern:*

Be it known that I, WILBUR A. HENDRYX, a citizen of the United States of America, residing at Los Angeles, in the county of Los Angeles and State of California, have invented certain new and useful Improvements in Apparatus for Extracting Metals from Their Ores and Solutions and for Agitating Purposes; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to an apparatus for extracting metals from their ores and from solutions and for agitating purposes; and the objects of my invention are, first, to provide an apparatus in which crushed or ground or pulverized ores may be treated in solutions for the extraction of their values; second, to provide an apparatus in which crushed or ground or pulverized ores may be treated in cyanid solutions; third, to provide an apparatus in which crushed, ground, or pulverized ores may be treated in chemical solutions and in which the ore-pulp and chemical solutions are in constant, continuous, and progressive agitation; fourth, to provide an apparatus in which crushed, ground, or pulverized ores may be treated in chemical solutions and be agitated and also be continuously and progressively aerated; fifth, to provide an apparatus in which crushed or ground or pulverized ores may be treated and their values recovered by electrolytic deposition; sixth, to provide an apparatus in which crushed or ground or pulverized ores and slimes may be continuously and progressively agitated and aerated and their values extracted by chemical solutions or electrical precipitation; seventh, to provide an apparatus in which fluid, either by itself or mingled with other substances, may be agitated by upward or downward movement; eighth, to provide a cyaniding apparatus by means of which crushed, ground, or pulverized ores may be treated in cyanid solutions and be continuously, progressively, and evenly agitated and be continuously and progressively and evenly charged with all the oxygen it is capable of absorbing from the commencement of its treatment until its values have been extracted; ninth, to provide an apparatus for the treatment of crushed or ground or pulverized ores by suitable hot chemical solutions; tenth; to provide an ore-treating tank and apparatus in which pulp solutions may be agitated by positive and continuous upward and downward movement of ore-pulp solutions; eleventh, to provide an ore-treating tank and apparatus in which ore-pulp solutions and cyanid or other solutions are aerated by direct contact with the atmosphere; twelfth, to provide an ore-treating apparatus in which the refractory metallic compounds and the volatile elements of ores are broken up, separated, and decomposed, and their values extracted and removed by positive vertical reciprocal movement and agitation, oxidation, or aeration of the pulp, combined with the use of cyanid or other chemical solutions and electrolytic deposition, and to regenerate the chemicals and prevent the fouling of the solution. I attain these objects by the mechanism illustrated in the accompanying drawings, in which—

Figure 2:
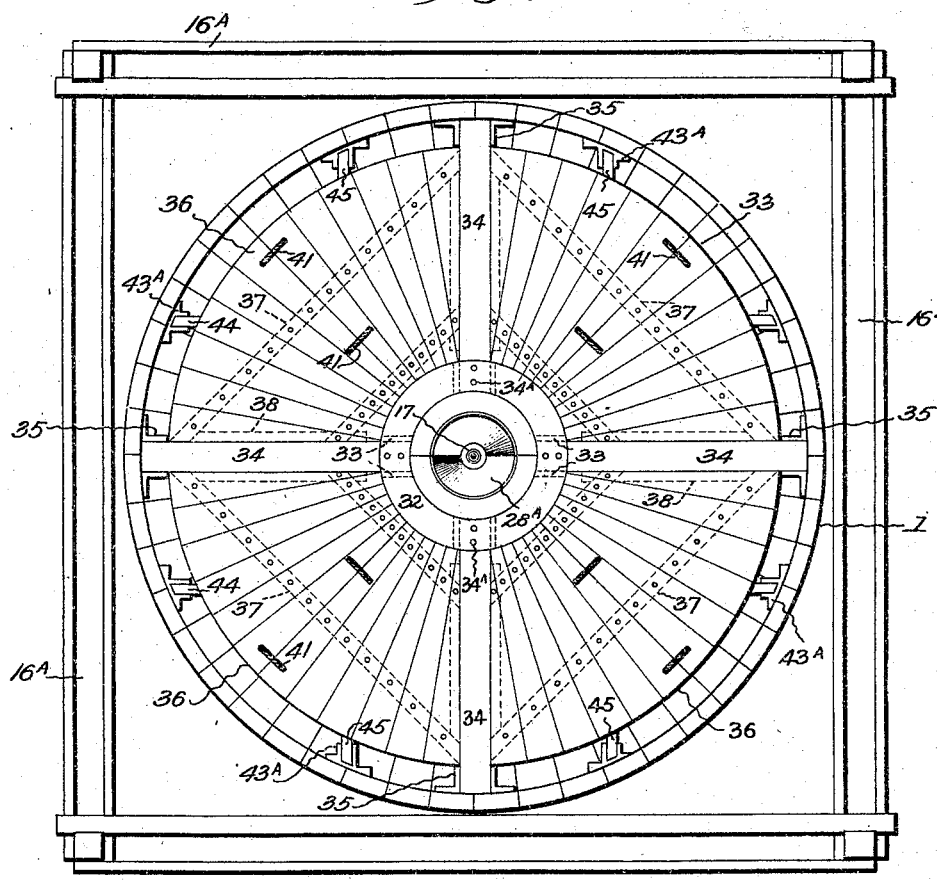
Figure 10:
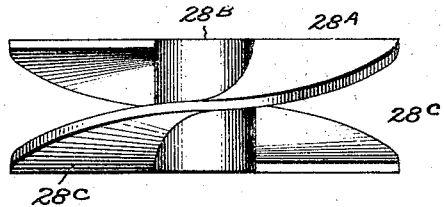

Figure 1 is a vertical section of an apparatus embodying my invention. Fig. 2 is a plan view of Fig. 1. Fig. 3 is a plan view of the valve cage or casing, having a spider secured in its upper end in which is supported the lower end of the propeller-shaft. Fig. 4 is a side view, partly in section, of the same, showing one of the adjustable doors or gates which are secured thereon. Fig. 5 is a horizontal sectional view of the same on the line 5 5 of Fig. 4. Fig. 6 is a bottom plan view of the retaining-cap, which is secured upon the conical lower end of the tank. Fig. 7 is a side view, partly in section, of this cap. Fig. 8 is a plan view of the pump or propeller-casing. Fig. 9 is a vertical sectional view illustrating the upper and lower ends of the propeller-shaft, the valve-stem being shown passing through the same and through a packing-box upon its upper end, while a ball-bearing box supports the said shaft. Fig. 10 is a side view of the form of propeller which I preferably employ. Fig. 11 is a fragmentary perspective view illustrating the construction of the ore-pulp-distributing table at the top of the tank. Fig. 12 is a perspective view of a group of anode-frames separated by insulated blocks, which blocks support a plurality of cathode-plates; and Fig. 13 is a fragmentary sectional view of a modified apparatus, the ore-pulp distributing and aerating table being omitted.

Referring to the drawings, the numeral 1 designates a stationary tank, preferably a round tank. This tank may be made of wood or iron; but it is preferably constructed of wood. This tank is supported above the floor or foundation level by any suitably-constructed frame. As illustrated, it is supported in a square frame of timbers 2, which is constructed to rigidly support it in all directions. The upper part of the tank is preferably a straight cylindrical form of tank. Its bottom, however, is conical and slopes and tapers evenly all round, convergingly from the sides to the axial center of the tank. In the axial center of the conical bottom I form a discharge-aperture 3. Around this discharge-aperture I place a valve-seat 4. This valve-seat comprises a cage-shaped casting and consists of a conical bottom portion, which is formed to fit the conical form of the bottom of the tank and a tubular depending portion that fits in the discharge-aperture. The end of this tubular portion is interiorly threaded to receive suitable pipe-fittings to convey the contents of this tank to other tanks for further treatment or to run it to waste. On the upper side edge of the bottom portion of this valve-seat I form short upward-projecting legs 5 at substantially equal distances apart, which are connected integrally at the top by a flat ring-shaped flange 6, thus forming an open space between said top flange 6 and the conical bottom portion and the legs, which permits the contents of the tank to flow into the center of the cage-shaped valve-seat casting and either be discharged or be vertically raised by the screw-propellers, as will be explained hereinafter.

The openings between the legs of the valve-seat cage are larger in the castings than are required for the flow of ore-pulp from the tank into the casing; but they are made so in order to enable an operator to reach in between them and to the valve-seat and valve. I have also found that in practice some ores require a larger area of inlet-space into the valve-cage than others. Consequently I partially close these openings by adjustable gates 5$^A$, which consist of metal plates which are secured to the legs by bolts 5$^B$. These plates are provided with oblong slots 5$^C$, through which said bolts pass, which enables them to be moved up and down on the bolts and be clamped in adjusted positions. The top edges of the plates overlap the top portions of the sides of the cage below the flange and are adjusted to partially close these openings by moving them downwardly.

The valve-seat 4 consists of a conical portion formed around the discharge-aperture in the bottom portion of the casting. This valve-seat casting is bolted to the bottom of the tank by bolts 7, which extend vertically down through the bottom of the tank, and in order to more firmly secure the valve-seat casting and the converging end of the conical bottom of the tank together I fit a conical tubular cap-casting 8 over the inverted apex of the conical bottom and provide it with a flange 9, through which the bolts 7 extend. This cap and the discharge-valve seat and the staves of the conical bottom are thus rigidly bolted together. In the valve-seat I fit a valve 9$^A$, which preferably comprises a conical plug-valve, the top of which is provided with two oppositely-extending wings 10, the extremities of which are provided with slotted slideways that fit loosely and slidably on two vertical guideway-lugs 11, that are formed on the inside of two of the flange-supporting legs of the valve-seat to receive the slideways of the valve. I secure to the valve a valve-stem 12. I preferably use a tubular valve-stem. I secure the lower end of the valve-stem preferably by forming a taper hole 13 axially through the valve and tapering the end of the stem to fit it, and extend the end of the stem far enough through it to thread a nut 13$^A$ to its end, which is screwed up tight against the valve and rigidly secures the valve and stem together. This valve-stem extends axially up through and above the tank. Its upper end is threaded, and a hand-wheel 14 is threaded to it. It is journaled at its upper end in a box 15, which is secured by a cross-timber 16, that forms a part of a frame 16$^A$, that I preferably make independent of the tank's supporting-frame. The hand-wheel rests on the top of the box, and the valve is opened or closed by turning the hand-wheel to raise or lower the valve-stem. This valve-stem is surrounded closely but loosely by a tubular shaft 17, which extends from above the tank and near to the hand-wheel of the valve-stem.

The upper end of the tubular shaft is journaled in vertical boxes 18, which are secured to cross-timbers 19. These boxes are provided with a transversely-arranged ball-bearing 18$^A$ in their top ends, which comprises a raceway 19$^A$ and rows of balls 19$^B$, and on the shaft a collar 20 is secured, which bears on and rotates on each ball-bearing. These collars and ball-bearings take the vertical thrust of the tubular shaft, while the shaft is journaled vertically by the boxes. I preferably use but two of these boxes, and above the upper box and the adjacent collar the shaft terminates and its end is exteriorly threaded, and on its threaded end I secure a packing-box 20$^A$. The lower end of the packing-box is counterbored and threaded and screws onto the threaded end of the shaft. The upper end of the stuffing-box is provided with a packing-receptacle 21, in which a gland 22 is slidably fitted. Cap-screws 23 are threaded to the top of the packing-box, which extend loosely through the gland and adjustably secure it to the box. Suitable packing 24 is placed in the packing-receptacle of the box around the valve-stem. The lower end of the shaft is threaded, and a cap 25 is threaded part way on it. This cap contains an aperture in its bottom that fits loosely around the valve-stem, which passes loosely through it. In the bottom of the cap a rubber cylindirical washer is placed, which is formed to fill the bottom of the cap and also to extend up into the end of the hollow shaft a short distance and form a journal packing and bearing for the lower end of the shaft around the valve-stem. The cap sets loosely in a recess 27, formed in the center of a spider-casting 28, that fits into the top of the valve-cage and is secured to its side legs' flange. This bearing in the spider and valve-cage acts to steady and support the lower end of the shaft. Upon the shaft I secure any suitable ore-pulp-lifting device, such as any suitable pump that can be operatively arranged to elevate the ore-pulp through the medium of the rotating shaft, and especially any suitably-arranged ore-pulp-moving arms, blades, or screws. I preferably, however, use for this purpose a number of screw-propellers $28^A$, which I term "ore-pulp-lifting" propellers. I preferably construct these pulp-lifting propellers with a hub portion $28^B$, from which radiates oblique screw-blades $28^C$. I preferably form two screw-blades on each hub, placing them on opposite sides of each other and extend each blade about one-half around the circumference of the hub. I preferably place three of these pulp-propellers on the shaft, placing one just above the valve-cage, one at about the center of the height of the tank, and the third toward its top, and upon the upper part of the shaft, above the tank, I secure a pulley 29, which is adapted to be connected by a belt to a source of power.

Upon the top of the valve-cage I secure one end of a cylindrical casing 30, which I term the "ore-pulp's vertical passage-way," and also the pump or propeller casing. This cylindrical casing is made to fit loosely but closely over the propellers $28^A$, which rotate within it. The opposite end of this cylinder extends to the top portion of the tank, preferably even with it. This cylinder or pump casing may be made of any suitable material, and it may be made as one integral cylinder throughout its length, if desired; but I preferably make it in two cylindrical sections $30^A$ and $30^B$ and provide each section with top and bottom flanges 31 and bolt them together. I also preferably make each section in two halves $30^C$ and $30^D$ and form flanges $30^E$ on their edges and rivet or otherwise secure the half-sections lengthwise together around the propeller after the valve-stem and shaft and propellers have been placed in the tank. It is much easier to put the pump parts together if the cylinder is made in this way than if the sections of the cylinder are made in one integral piece. Especially is this the case in tanks of large capacity; but in small-sized tanks they may be made in complete cylindrical form. These flanges 31 are also preferably made in two equal halves and are secured to the end of the halves of the sections of the cylinder. The top flange of the cylinder fits into a counterbore $31^A$, formed in the top of a ring 32.

The above-described cylindrical casing constitutes a vertical passage for the ore-pulp in its continuous vertically-reciprocating movement in the tank, due to the lifting character of the means I employ to agitate the ore-pulp, and it is also a pumpway, although I do not illustrate a pump of the types in common use, but preferably illustrate a form of screw-propeller that vertically and positively lifts the ore-pulp in a mass. My invention, however, is not limited to the propellers shown or to a pump, but contemplates the use within or attached to said ore-pulp's vertical passage-way in any operative manner of any type or character of vertically ore-pulp-lifting device or machine, and particularly such machines or devices or mechanism as would lift the ore-pulp by suction or by any suitable upward force from below.

The ring 32 I term the "deflector," as it forms the apex of the ore-pulp-aerating deflector 33, which I most generally use in the treatment of ores, but which can be dispensed with, in the form I preferably illustrate it in the drawings. On some ores this deflecting-ring could be made large enough in diameter to fill any desired requirement for which it is intended, and its peripheral edge could be supported from the walls of the tank, and suitable openings could be formed through it to allow the ore-pulp to flow back into the tank. This deflector may consist of a disk or flange or plate of any character connected to the top of the vertical passage-way of the ore-pulp in the tank and may be designed to extend any predetermined distance from the ore-pulp's vertical passage-way toward the walls of the tank, and it may be constructed of any suitable material. I preferably construct this aerating-deflector, however, of wood and in the following manner: The deflector-ring 32 consists of a top flange portion $32^A$, on the bottom of which are formed four pairs of depending lugs 33, placed equidistant apart around the ring. Each pair of lugs is spaced far enough apart to receive one of the ends of four joists 34, which are bolted vertically through the top flange of the ring by the bolts $34^A$. The ends of the joists are rabbeted to extend under the flange and bring its top edge even with its top surface. The opposite ends of these joists are supported by stirrups 35, which are secured to the inner side wall of the tank. These joists and the top surface of the deflector-ring are inclined at a slight angle downward from the center of the ring to the side walls of the tank to form a conical-shaped supporting-frame. I place upon the frame four independent removable segment-doors 36, (see Figs. 2 and 11,) each of which is provided with depending crossbars 37, which extend loosely down between each two joists and rest on cleats 38, which are secured to the sides of the joists in positions to bring the side edges of the segment-plates even with the top edges of the joists and the deflector-ring. A depending flange edge 39 is formed around the edge of the segment-doors, and these segment-doors of the conical deflector extend from the ring toward the walls of the tank a predetermined distance, their length depending on the space required to discharge the pulp between them and the walls of the tank. Some ores require more space than others in order to discharge from the deflector and drop in the tank in proper contact with the anodes and cathodes below the deflector. This variable space is met by making the segment-doors of different lengths. As illustrated, they extend close to the stirrups, and consequently a space is left between them and the walls of the tank all around it except where the stirrups and joists are positioned. The tops of these segment-doors are preferably convexed transversely from side to side. These segment-doors are preferably made of strips of wood laid radially and fitted to abut against the deflector-ring; but, if desired, they may be made of sheet metal and the joists can also be made of structural metal. Each door-section is provided with handles 41, which enables them to be lifted out of the frame on which they rest, which is necessary in order to get into the tank and to insert and remove the cathodes. These handles are preferably made of rope, the ends of which pass through holes formed in the door-segments and are knotted below them. These removable independent convexed door-sections and their supporting-frame comprise the preferred construction of my pulp-aerating deflector upon which the ore-pulp is discharged from the ore-pulp's vertical passage-way and is exposed to the atmosphere.

The screw or blades of the propellers have a tendency to swirl the ore-pulp in the casing, and to obviate this I secure to the inside of the casing a number of ribs 43, which are arranged vertically in the casing and extend from the walls of the casing to close to the shaft and from one ore-propeller to the other. I preferably use four ribs. The ribs in the center of the half-sections are fastened to the casing; but at the joints between the halves they are inserted in the joints and are clamped between the halves of the casing, where they are secured together. The action obtained on the ore-pulp or fluids by this form of agitation, owing to the use of these ribs or wings, is the vertical upward flow of the stream through the vertical compartments made in combination with the casing, giving a vertical continuous flow. By reversing the pitch of the propellers or by reversing the rotation of the shaft the stream can be delivered vertically downward without the rearrangement of the ribs. In other words, the stream may be carried either vertically up or down by the use of either a right-handed screw or a left-handed screw-propeller. In the event of a downward vertical flow the tank is filled so as to submerge the upper end of the propeller-casing, the propellers taking their feed from the top instead of from the bottom and discharging at the bottom instead of the top and causing agitation in the tank by the upward flow of the pulp solutions, the deposition of the metals occurring in the upward passage of the solutions through the plates, the solutions absorbing their oxygen as they come to the surface to enter the propeller-casing.

One of the essential features of the recovery of the precious and other metals from their ores in my apparatus is the electrolytic deposition of the metallic values from the chemical solutions used to extract them from the ores. In carrying out this feature my invention contemplates the use of any type or character of anodes and cathodes, arranged in any operative order in the tank, and connected operatively to the poles of any suitable low-tension electric-current generator, and in the practical operation of my apparatus I preferably carry out this feature of my invention as follows: To the sides of the tank, near the junction of the straight cylindrical and conical parts of the tank, I bolt a plurality of saddle-castings $43^A$, preferably using eight and placing them equidistant apart in a horizontal plane. Each two opposite pairs of these saddles support the opposite ends of beams 44, which extend across the tank. The opposite two pairs of saddles support one end of four short beams 45, the opposite ends of which are mortised to the beams 44. This framework of beams forms the support for a plurality of anode-frames $46^A$. I preferably arrange these anode-frames in alternate order in block-shaped groups, which may be of any size that can be conveniently placed in the tank, and they are spaced at equal distances apart by insulating-blocks 49, which are placed between each two anode-frames, at their upper and lower corners and at their central portions. The anodes consist of suitable electrodes 46 in the form of carbon plates, which are suitably secured in the frames $46^A$. The cathodes consist of suitable electrodes 47 in the form of lead plates. Holes are formed centrally in the anode-frames 46^A near their ends, and the blocks are also provided with a central hole and bolts 50 are inserted through the holes in the blocks and anode-frames and they are bolted together into a block-shaped group of anodes and cathodes. The insulating-blocks are also provided with central slots 49^A, and the cathode-plates 47 slide freely into these slots between the anode-frames and anodes, as they have frequently to be removed and cleared and scraped to remove the deposited metals. I preferably use four blocks of anodes and cathodes, and they are placed across each parallel pair of beams of the supporting-frame. They are positioned on the frames to stand at a tilting angle that will bring the cathode-surfaces in the direct path of the ore-pulp as it falls from the deflector, moves vertically downward with the body of the ore-pulp in the tank as it is drawn into the casing by the propeller, and they are supported in that position by an inclined notch 50^A, formed in the top of the frame in which they rest, and by a brace 51, which extends from the top of each block of anodes to the side of the tank to which it is secured. Each cathode is arranged so it can be easily lifted out of the slots 49^A of the blocks 49 and out of the tank. Each block of anodes is operatively connected by a suitable circuit-wire to the positive pole of a low-tension electric-current generator, and from each block of cathodes a circuit-wire extends to the negative pole. These circuit-wires and generator I do not illustrate.

I have found in practice that in the treatment of some ores it is an advantage to heat the ore-pulp, as it increases the extracting qualities of the solutions, lessens the time of treatment, and often results in an increased percentage of recovery of the values over that attained under similar conditions when the ore-pulp is treated cold, and in carrying out this feature of my invention I preferably use two groups of return coiled pipes 54 and 55, which I preferably place directly under the anode-supporting beams and secure them to its under side. These coils are connected together by a pipe which extends from one coil to the other, but which does not show in the section in Fig. 1. From the outer end of each coil branch pipes 57 and 58 extend out through the opposite sides of the tank. One of these pipes is connected to a source of steam-supply, which passes through the coils and exhausts from the other pipe or is led from it to further use. The branch pipes 57 and 58 are provided with check-nuts 59, which are threaded on the pipes and against the opposite sides of the tank to support them and to prevent leakage through the apertures in the tank through which the pipes extend.

In the treatment of some ores or products the electrolytic-deposition mechanism may be dispensed with, if desired, particularly where the agitating mechanism is used alone to agitate solutions—such as pulps of woods, clays, shales, cements, and other products that require very thorough mixing—and the conical deflector may also be dispensed with, if desired.

The operation of my improved ore-treating apparatus is as follows: Crushed, ground, or pulverized ore is mixed into ore-pulp, which is ore mixed with water and chemicals, making the pulp consist of ore and chemical solutions. The mixing of the ore into ore-pulp is preferably done in ore-grinding machinery, which I do not illustrate, and is run into this treatment-tank through a launder or pipe; but, if desired, the ore can be fed into the treatment-tank in fixed charges and the solutions added to it in sufficient quantity to make a pulp of the desired consistency and in sufficient quantity to fill the tank and casing about full. Power is applied to the shaft and propellers through the pulley, and the propellers are rotated rapidly in the casing. The rapid rotation of the propellers lifts the ore-pulp vertically in the casing, and it is quickly and bodily lifted by the propellers to the top of the casing, from which it overflows onto and over the top of the deflector in direct contact with the atmosphere and absorbs oxygen therefrom as it flows to and discharges from its peripheral edge, from which it falls into the tank and drops and flows in direct contact with the anode and cathode plates in such a gentle manner as to entirely avoid any deleterious action by attrition or scouring and falls directly in its downward path to the valve-cage, into which it again enters and is again elevated and continued in its endless continuous vertical reciprocating course up and over the aerating-deflector and down in the tank to the cage and casing, the movement of the ore-pulp being a continuous progressive endless-stream movement in which the ore-pulp is so thoroughly commingled and agitated that every particle is held in action and in perfect suspension, which permits the chemical agents to more thoroughly attack and decompose and extract the metallic values than by any method of agitation heretofore used. As the ore-pulp flows over the deflector it is spread out into a thin sheet which runs evenly down the entire surface of conical deflector, the conical deflector thus tending to bring every atom of the ore-pulp in direct contact with the atmosphere. The electric current is turned on at the same time the agitating treatment begins and is kept flowing, preferably constantly, until the extraction is satisfactory. The current flows through circuit-wires to the anodes and through the solution to the cathodes and collects from the solution the ions of the metals and deposits them on the cathodes. Each charge of ore-pulp is treated for a predetermined period of time, depending upon conditions, but which varies from about two to about twelve hours, and when tests show that a satisfactory recovery of the values has been attained and collected on the cathodes the discharge-valve is then opened and the greater portion of the charge is run out before stopping the propellers, which continues to keep the ore-pulp in agitation and prevents settling. After the greater portion of the ore-pulp is discharged the propellers are stopped and the balance of the ore-pulp is run out, and the discharged ore-pulp may be subject to further treatment, if desired, such as concentration, as in case of ores containing particles of metals too coarse for the solution to penetrate. The charge, however, is always run into receiving-tanks, which I do not show, and the solution separated or decanted from the ore and is returned and strengthened and used again with other charges in the tank.

The electrolytic action of the electric current on the aerated chemical solution operates to continuously purify them and to keep them pure from fouling by taking up the base compounds and elements that they throw off while the chemical compounds of the ores are being dissolved by the chemical solutions. The chemical solutions are thus kept pure, and more effectually take up the values and in shorter time than in those systems of chemical treatment where a purifying medium of like character is not used. Consequently the chemical solutions after the treating of a charge are in as perfect condition as when first applied, and as they are apt to hold a small percentage of the dissolved values of metals and chemicals they are invariably separated from the ores after treatment in the tank and used over again.

My improved apparatus for the treating of ores by the combined use of chemical solutions and electrolytic deposition and aeration is new in the methods and mode of action of the ore-pulp during treatment, and while I have illustrated and described the preferred construction of my solution-treatment apparatus I do not wish to be limited to it, as my invention contemplates, broadly, the application in a tank of any kind or character of an independent vertical passage for the ore-pulp from the body of the tank and connected thereto and every and any means of bodily moving the ore-pulp out of the tank into direct contact with the atmosphere and moving it in a continuous progressive endless stream in direct contact with electrolytic apparatus for operatively collecting the metal values taken up by the solutions and for purifying said solutions.

Having described my invention, what I claim as new, and desire to secure by Letters Patent, is—

1. An apparatus for treating ores, comprising a tank, means for continuously aerating the contents of said tank by lifting portions and distributing them in contact with the atmosphere, and electrodes within said tank.

2. An apparatus for treating ores, comprising a tank, means for continuously aerating the contents of said tank by lifting portions and moving them in a thin sheet in contact with the atmosphere, and electrodes within said tank.

3. An apparatus for treating ores, comprising a tank, a spreader for aerating the ore-pulp, a passage-way leading from the lower portion of said tank and discharging upon said spreader, means for circulating pulp through said passage-way, and electrodes within said tank.

4. An apparatus for treating ores, comprising a tank, a conical spreader above said tank, a central passage-way communicating with the lower portion of said tank and discharging upon said spreader, means for circulating pulp through said passage-way and electrodes within said tank.

5. An apparatus for treating ores, comprising a tank, means for continuously aerating the contents of said tank by lifting portions and distributing them in contact with the atmosphere, and non-vertical, spaced electrodes within said tank.

6. An apparatus for treating ores, comprising a tank, means for continuously aerating the contents of said tank by lifting portions and moving them in a thin sheet in contact with the atmosphere, and non-vertical, spaced electrodes within said tank.

7. An apparatus for treating ores, comprising a tank, a spreader for aerating the ore-pulp, a passage-way leading from the lower portion of said tank and discharging upon said spreader, means for circulating pulp through said passage-way, and non-vertical, spaced electrodes within said tank.

8. In an apparatus for the treatment of ores, an ore-pulp-holding tank, an independent passage-way connected to said tank and provided with an inwardly-extending partition member, and a rotary pumping member in said casing arranged and adapted to move ore-pulp in a continuous stream through said passage-way and through the body of said tank.

9. In an apparatus for the treatment of ores, an ore-pulp-holding tank, an independent passage-way connected to said tank, a plurality of partition members in said passage-way, and means connected with and including a rotating shaft for agitating and bodily lifting ore-pulp in a continuous endless stream up said passage-way between said partitions, and down through said tank.

10. In a tank for holding a supply of solution, an independent passage-way connected at its lower end to the bottom of said tank, and arranged and adapted to discharge at its top and within said tank, a rotary device within said passage-way for pumping said solution through said passage-way and said tank, and means including a vertically-disposed rib or ribs within said passage-way for preventing said rotary pumping device from imparting a rotary movement to said supply of ore-pulp during its movement through said passage-way.

11. In an apparatus for treating ores, a tank having a conical bottom and constructed to hold a supply of ore-pulp, a vertical independent passage-way for said ore-pulp through the body of said tank to the atmosphere, channeled spaces in said passage-way, an aerating-plate surrounding the top of said passage-way, a rotating shaft connected to said tank, and means connected with said shaft for moving said supply of ore-pulp up said passage-way and channeled spaces and over said aerating-plate and down through said tank in a continuous, endless stream.

12. In an ore-treating apparatus, a tank, a cylindrical casing within said tank extending from its bottom up through said tank, and open at its top to the atmosphere, an ore-pulp inlet at the bottom of said casing within said tank, a shaft rotatably mounted in said casing, screw-propellers secured to said shaft and arranged to fit rotatably in said casing, and a channeled passage or passages in said casing around said shaft, between said screw-propellers.

13. In an ore-treating apparatus, a tank, a casing connected to said tank and forming an inclosed ore-pulp passage-way, and communicating with said tank at its upper and lower end, a shaft rotatably mounted in said casing, a rotating device connected to said shaft adapted to move ore-pulp through said casing, and a rib or ribs extending inwardly from the inner peripheral surface of said casing close to said shaft.

14. In an ore-treating apparatus, the combination of a tank having a conical bottom, and constructed to hold a supply of ore-pulp, a passage-way connected to said tank and independent of the body of said tank and connected to it at its lower end and extending a predetermined distance upwardly, a power-driven shaft within said passage-way, screw-propellers secured to said shaft within said passage-way, a partition or partitions extending inwardly from the inner surface of said passage-way close to said shaft, between said propellers, and operatively-arranged electrodes arranged within the body of said tank in said ore-pulp.

15. In an ore-treating apparatus, a tank constructed to hold a supply of chemical ore-pulp, means for moving said ore-pulp, and electrodes operatively supported in said tank to electrically recover the metallic values from said chemical ore-pulp, and arranged to stand at an oblique angle to the movement of said ore-pulp.

16. In an ore-treating apparatus, a tank constructed to hold a supply of ore-pulp, electrodes operatively arranged in said tank in said ore-pulp at a slight angle to the path of the flow of the ore-pulp, and means for moving said chemical ore-pulp in a vertical path in contact with said electrodes.

17. In an ore-treating apparatus, a tank having a conical bottom, an independent ore-passage in said tank connected at its bottom portion with said tank, and having its top portion exposed to the atmosphere, electrodes in said tank positioned at a slight angle to the vertical axis of said tank and operatively connected to a source of electrical-current supply, and comprising groups of anodes and cathodes, a supply of chemical ore-pulp solution in said tank, and means including an operative shaft for moving and agitating said chemical ore-pulp solution in a continuous endless stream through said tank and its independent passage-way and in contact with said electrodes.

18. In an ore-treating apparatus, the combination with a tank, of the vertical passage-way, the channeled passage-ways in said passage-way, the screw-propellers and shaft in said passage-way, said tank and passage-way being provided with a supply of chemical ore-pulp solution, electrodes in said tank operatively connected to a source of current-supply, arranged at an oblique angle to the axis of said tank and arranged and adapted to electrically precipitate metals from said solutions onto said electrodes, means for introducing oxygen into said chemical ore-pulp solutions, and means for moving said ore-pulp in contact with said electrodes.

19. In an ore-treating apparatus, a tank constructed to hold a supply of cyanid ore-pulp solution, means including an independent passage-way connected to said tank for moving said cyanid ore-pulp solution in a continuous stream through said passage-way, a plurality of anodes and cathodes arranged around the interior of said tank in said supply of cyanid ore-pulp solution, means for flowing said cyanid ore-pulp solutions in a continuous circumferential showering stream into the body of ore-pulp in said tank, means for drawing said ore-pulp down through said anodes and cathodes with a slow current movement in contact with said anodes and cathodes, means for moving said ore-pulp with a more rapid movement through said passage-way than through the body of said tank, whereby said endless moving current of ore-pulp flows in contact with said anodes and cathodes with a slow gentle movement to lessen the attrition of the ore-pulp against the anodes and cathodes.

20. In an ore-treating apparatus, a tank provided with a sloping bottom and constructed to hold a supply of cyanid ore-pulp solutions, an open platform in said tank, a plurality of groups of anodes and cathodes resting on said platform at an oblique angle to the axis of said tank around the interior of said tank and in said cyanid ore-pulp solutions, means including a vertically-disposed channeled independent passage-way connected with said tank for moving said cyanid ore-pulp in a substantially vertical plane through said passage-way, and means connected with said passage-way for spreading said cyanid ore-pulp solutions in a thin circumferential stream in contact with the atmosphere and for flowing in a circumferential stream said cyanid ore-pulp solutions in contact with said plurality of groups of anodes and cathodes.

21. In an ore-treating apparatus, a tank constructed to hold a supply of cyanid ore-pulp solutions, means including an independent passage-way connected to said tank for moving said cyanid ore-pulp solutions through said passage-way, a plurality of anodes and cathodes connected to a source of current-supply, and means for discharging the ore-pulp from said passage-way into the body of ore-pulp in said tank in a finely-divided showering stream or spray of large enough area to fall into the body of ore-pulp in said tank in such a manner as not to disturb the slow even gentle downward-flowing movement of the supply of ore-pulp in said tank in contact with said electrodes.

22. In an ore-treating apparatus a tank, an inclosed passage-way connected with the body of the tank at its lower end, an ore-pulp-distributing platform connected with the top portion of said inclosed passage-way and arranged to discharge ore-pulp into said tank, and suitable electrolytic electrodes within said tank below said ore-pulp-distributing platform, operatively connected to a suitable current-generator.

23. In an apparatus for treating ores, an ore-pulp-holding tank having a conical bottom and provided with a supply of ore-pulp, a vertical independent passage-way provided with a plurality of introverted ribs arranged to divide said independent passage-way into a plurality of passages for said ore-pulp through the body of said tank to the atmosphere, an aerating-plate surrounding the top of said passage-way, a rotating shaft connected to said tank and means connected with said shaft for moving said supply of ore-pulp up said passage-way and passages and over said aerating-plate and down through said tank in a continuous endless stream, and an operative electrolytic deposition apparatus arranged in the body of said tank in the downward-flowing path of said ore-pulp.

24. In an ore-treating apparatus, a tank having a conical bottom, a valved controlled discharge-passage in the bottom of said tank, means including a valve-stem for operating said valve, an inclosed passage-way surrounding said valved discharge-aperture, a power-driven shaft connected to said tank, a supply of ore-pulp in said tank and means connected to said power-shaft for moving said ore-pulp up through said inclosed passage-way and down through said tank in a continuous stream.

25. In an ore-treating apparatus, a tank having a conical bottom, a valve-controlled discharge-aperture in said bottom, a casing surrounding said valve-controlled passage-way, and extending up to the atmosphere, pulp-inlet apertures at the lower end of said casing, a supply of chemical ore-pulp in said tank and casing, a power-shaft connected to said tank and means connected to said power-shaft for moving said ore-pulp up through said casing into contact with the atmosphere and down through said tank to said pulp-inlet apertures at the lower end of said casing and means for separating said chemical ore-pulp into a thin stream as it discharges from said casing and falls back into said tank.

26. In an ore-treating apparatus, a tank having a conical bottom, a valve-controlled discharge-aperture in said tank, a supply of chemical ore-pulp in said tank, a cylindrical casing extending from the bottom of said tank to its top and open to the atmosphere and arranged to form a passage-way in said tank independent of its body portion and provided with ore-pulp-inlet apertures, means connected with the top of said casing for exposing said ore-pulp to the atmosphere, a shaft rotatably mounted in said casing, and means connected to said shaft for moving said chemical ore-pulp up through said cylindrical casing and down through the body of said tank in a continuous endless stream, a plurality of electrolytic anodes and cathodes operatively connected to a suitable current-generator and positioned in the body of said tank in the downward vertical flowing path of said stream of ore-pulp.

27. In an ore-treating apparatus, the combination with a tank having a conical bottom, provided with a discharge-aperture, of a cage-shaped valve-seat secured to said discharge-aperture, a cylindrical casing projecting from said valve-seat a predetermined distance in said tank, a valve operatively arranged in said valve-seat and tank to control said discharge-aperture, a shaft rotatably supported in said casing, screw-propellers on said shaft fitting rotatably in said casing, and vertical blades projecting from said casing to said shaft between said screw-propellers, substantially as described.

28. In an ore-treating apparatus, the combination with a tank having a conical bottom and a discharge-aperture at its lowest point, a caged valve-seat secured around said discharge-aperture, a valve seated in said valve-seat, a hollow valve-stem extending above said tank, means for operating said valve-stem and valve to control said discharge-aperture, a cylindrical casing secured to said caged valve-seat, a hollow shaft around said valve-stem, means for rotatably supporting said hollow shaft around said valve-stem and in said casing, a plurality of screw-propellers on said shaft fitting said casing and radial partitions in said casing, substantially as described.

29. In an ore-treating apparatus, the combination with the tank having a conical bottom and a discharge-aperture in said bottom, of a valve-seat casing secured to said discharge-aperture, slideways in said seat, a valve fitting said seat and slidably connected to said slideways and means for raising and lowering said valve, substantially as described.

30. In an ore-treating apparatus, the combination with the tank having a conical bottom and a discharge-aperture, of a valve-seat secured to said discharge-aperture, a valve slidably mounted in operative relation to said valve-seat, a stem secured to said valve and extending above said tank, a support for said valve-stem and a hand-wheel threaded to said stem and arranged to open and close said valve, substantially as described.

31. In an ore-treating apparatus, the combination with the tank having a conical bottom, provided with a central discharge-aperture, of a cap-ring surrounding the outside of the inverted apex of said conical bottom and its discharge-passage, a caged valve-seat casting surrounding said discharge-passage on the inside of the inverted apex of said conical bottom, means for securing said cap-ring and said valve-seat casting and said inverted apex of said conical bottom together, a valve slidably mounted in said valve-seat casting, a valve-stem secured to said valve, and means for opening and closing said valve, substantially as described.

32. In an ore-treating apparatus, the combination with the tank having a conical bottom, and a discharge-aperture in its inverted apex, of the cap-ring and the caged valve-seat, the valve slidably seated in said caged valve-seat, the valve-stem and the hand-wheel arranged to open and close said valve, of a hollow shaft surrounding loosely said valve-stem, a suitable support in said caged valve-seat for the lower end of said shaft, means including ball-bearing boxes operatively arranged to journal said shaft and to support its vertical thrust, means for rotating said propellers on said shaft, and the casing surrounding said propellers and secured to said caged valve-seat.

33. In an ore-treating apparatus, the combination with the tank, the caged valve and the valve-stem operatively arranged in said tank, of a hollow shaft surrounding loosely and rotatably said valve-stem, a suitable support for said shaft adjacent to said caged valve, journal-boxes arranged to support said shaft above said tank, collars secured to said shaft and transversely-arranged ball-bearings arranged in said journal-boxes in engagement with said collars, screw-propellers on said shaft, the casing surrounding said screw-propellers and means for rotating said shaft, substantially as described.

34. In an ore-treating apparatus, the combination with the tank, the caged valve-seat, the valve-stem, the tubular propeller-shaft mounted loosely on said valve-stem, the casing surrounding said propeller-shaft, the bearings arranged to operatively support said propeller-shaft, and means for rotating said shaft, of a suitable packed joint between the open top end of said tubular shaft and said valve-stem comprising a cap fitting on the top of said tubular shaft, and an operative packing-receptacle in said cap surrounding said valve-stem, substantially as described.

35. In an ore-treating apparatus, the combination of the tank, the tank-supporting frame, the discharge-aperture in said tank provided with a valve-seat, a valve operatively supported in said valve-seat, a valve-stem secured to said valve, means for supporting the upper end of said valve-stem above said tank, means for operating said valve; a tubular propeller-shaft surrounding loosely said valve-stem, a casing surrounding said propeller-shaft, the ball-bearing and collar for supporting said shaft and a pulley secured to said shaft, with a gland stuffing-box on the top of said shaft, and mounted on and provided with suitable packing arranged to pack said valve-stem and to close the opening into said shaft, substantially as described.

36. In an ore-treating apparatus the combination with the tank having a conical bottom, provided with a valve-controlled discharge-aperture, and an independent passage-way in the tank, a supply of chemical ore-pulp solution in said tank, electrodes in said tank comprising alternate anodes and cathodes arranged at the four quarter-points of said tank and connected to a supply of electric current, means for moving said chemical ore-pulp solutions in a continuous endless stream through said tank and passage-way, and means for supporting said electrodes in said tank to bring the surfaces of said anodes and cathodes in contact with said moving stream of chemical ore-pulp solution.

37. In an ore-treating apparatus, the combination with the tank having a conical bottom provided with a discharge-outlet, a caged valve-seat secured to said discharge-outlet, a valve operatively arranged in said valve-seat to control said discharge-outlet, a casing secured to the top of said caged valve-seat, and inlet-passages in the sides of said caged valve-seat to said valved discharge-outlets and to said casing, of adjustable gates secured to said caged valve-seat and arranged to control said inlet-passages, substantially as described.

38. In an ore-treating apparatus the combination with the tank provided with a discharge-outlet, the caged valve-seat secured to said discharge-outlet provided with side inlet-apertures, and the casing secured to the top of said caged valve-seat, of means including gates for adjustably controlling the area of said inlets into said caged valve-seat, and said casing.

39. In an ore-treating apparatus the combination with the tank provided with a conical bottom and a discharge-aperture therein, a caged valve-seat arranged to control said discharge-aperture, a valve operatively arranged in said caged valve-seat, inlet-apertures in the sides of said caged valve-seat, and a casing secured to said caged valve-seat, of the plates adapted to partially close said inlet-apertures in said caged valve-seat, and means including bolts for adjustably securing said plates in predetermined positions to govern the area of said caged valve-seat inlet-apertures, substantially as described.

40. In an ore-treating apparatus, the combination with the tank provided with a discharge-aperture, a caged valve-seat arranged to control said discharge-aperture, a valve seated in said valve-seat, a valve-stem secured at one end to said valve and extending above said tank, a casing around said valve-stem and secured to said caged valve-seat, a tubular shaft surrounding loosely said valve-stem and rotatably mounted in said casing, a thread on the lower end of said shaft, a cap threaded partially on the threaded end of said shaft, a tubular rubber washer in said cap extending up into said shaft and arranged to surround and bear against said valve-stem, and a steadying-support for said cap in said caged valve-seat, substantially as described.

41. In an ore-treating apparatus, the combination with the tank provided with a tubular casing extending from its bottom to its top portion and connected at its bottom portion with the body of said tank, of a flanged ring secured to the top of said casing, a plurality of conically-arranged joists extending from said flanged ring to the inner periphery of said tank and spaced equidistant apart around the periphery of said flanged ring and said tank and segment-shaped doors removably secured between said joists, and arranged to form a space between their peripheral edges and the inner periphery of said tank, substantially as described.

42. In an ore-treating apparatus, a tank provided with a discharge-valve and an inclosed passage-way connected with the body of the tank at its lower portion with an ore-pulp-distributing platform connected with the top portion of said inclosed passage-way and arranged to discharge ore-pulp into said tank, and provided with independent removable sections having convexed surfaces.

43. In an ore-treating apparatus, an ore-pulp-holding tank provided with a casing arranged to form an independent passage-way in said tank for said ore-pulp, a conical, disk-shaped pulp-distributing surface connected to the upper portion of said ore-pulp independent passage-way and arranged to discharge said ore-pulp into said tank, and provided with door-controlled apertures.

44. In an ore-treating apparatus, the combination with an ore-pulp-holding tank provided with a conical bottom having a valve-controlled discharge-aperture therein, a cylindrical casing in said tank arranged to form an independent passage-way for said ore-pulp and extending from the bottom of said tank into the atmosphere, of a conical, ore-pulp-distributing surface connected to the top of said casing and adapted to distribute ore-pulp in a thin stream over its conical surface in contact with the atmosphere and to discharge said ore-pulp into said tank and having said conical ore-pulp-distributing surface provided with doors having convex surfaces registering with the curve of the said conical ore-pulp-distributing surface, and means connected with said casing and tank for moving said ore-pulp up through said casing.

45. In an apparatus for the treatment of solution, a solution-holding tank, an independent vertical passage-way in said tank having independent channel-ways therein, and means including a propeller-pump for moving said solutions in a continuous vertical stream through said passage-way and the body of said tank.

46. In an apparatus for agitating solutions, a solution-holding tank, a vertical passage-way in said tank, the cage at the bottom of said passage-way provided with adjustable gates, an operative discharge-valve in said cage, a deflector at the top of said passage-way, and means, including a suitable pumping or solution-lifting device, for moving said solutions up through said passage-way and through the body of said tank.

In testimony whereof I affix my signature in presence of two witnesses.

WILBUR A. HENDRYX.

Witnesses:
G. SARGENT ELLIOTT,
BESSIE THOMPSON.